United States Patent
Anthony et al.

(10) Patent No.: US 10,596,730 B2
(45) Date of Patent: Mar. 24, 2020

(54) HYBRID LAY-UP MOLD

(71) Applicant: Ascent Aerospace, LLC, Santa Ana, CA (US)

(72) Inventors: Parme G. Anthony, Williams, AZ (US); Michael Fox, Brea, CA (US); Zachary Skelton, Laguna Hills, CA (US); Daniel Brennan, Fullerton, CA (US); Randel Dean Moruzzi, Jr., Callmesa, CA (US)

(73) Assignee: Ascent Aerospace, LLC, Santa Ana, CA (US)

( * ) Notice: Subject to any disclaimer, the term of this patent is extended or adjusted under 35 U.S.C. 154(b) by 0 days.

(21) Appl. No.: 16/420,301

(22) Filed: May 23, 2019

(65) Prior Publication Data
US 2019/0358860 A1    Nov. 28, 2019

Related U.S. Application Data

(62) Division of application No. 15/403,278, filed on Jan. 11, 2017, now Pat. No. 10,427,330.

(60) Provisional application No. 62/277,264, filed on Jan. 11, 2016.

(51) Int. Cl.
| | | |
|---|---|---|
| B29C 33/38 | (2006.01) | |
| B29C 65/00 | (2006.01) | |
| B29C 70/54 | (2006.01) | |
| B29C 70/34 | (2006.01) | |
| B29C 70/44 | (2006.01) | |
| B29C 70/86 | (2006.01) | |
| B23K 103/02 | (2006.01) | |
| B29K 307/04 | (2006.01) | |

(Continued)

(52) U.S. Cl.
CPC ...... *B29C 33/3842* (2013.01); *B29C 33/3807* (2013.01); *B29C 66/712* (2013.01); *B29C 66/729* (2013.01); *B29C 66/7212* (2013.01); *B29C 66/74283* (2013.01); *B29C 70/342* (2013.01); *B29C 70/44* (2013.01); *B29C 70/542* (2013.01); *B29C 70/86* (2013.01); *B23K 2103/02* (2018.08); *B29C 2033/385* (2013.01); *B29K 2307/04* (2013.01); *B29K 2705/12* (2013.01); *B29L 2031/757* (2013.01)

(58) Field of Classification Search
CPC ... B29C 33/3842; B29C 66/712; B29C 70/44; B29C 70/342; B29C 66/74283; B29C 33/3807; B29C 70/86; B29C 70/542; B29C 66/7212; B29C 66/729; B29C 2033/385; B23K 2103/02; B29K 2307/04; B29K 2705/12

See application file for complete search history.

(56) References Cited

U.S. PATENT DOCUMENTS

| | | | | |
|---|---|---|---|---|
| 6,168,358 B1* | 1/2001 | Engwall | ................. | B23Q 3/086 409/219 |
| 2007/0120288 A1* | 5/2007 | Ashton | ............... | B29C 33/3842 264/258 |
| 2009/0035412 A1* | 2/2009 | Sobcinski | ............. | B29C 33/307 425/389 |

\* cited by examiner

*Primary Examiner* — Nahida Sultana
(74) *Attorney, Agent, or Firm* — The Weintraub Group, P.L.C.

(57) ABSTRACT

A hybrid mold includes (a) an Invar® eggcrate structure, (b) an Invar® interim working surface and (c) a CF composite material overlay. The eggcrate and interim working surface are welded or otherwise connected together to form a unitary base mold. The CF overlay is bonded to the interim working surface. The CF overlay is easily reconfigurable and can be replaced without destroying the integrity of the base mold.

5 Claims, 2 Drawing Sheets

(51) Int. Cl.
*B29K 705/12* (2006.01)
*B29L 31/00* (2006.01)

HYBRID LAY-UP MOLD

CROSS-REFERENCE TO RELATED APPLICATIONS

This is a divisional application of U.S. application Ser. No. 15/403,278, filed Jan. 11, 2017, which is a completion application of U.S. Provisional Patent Application Ser. No. 62/277,264, filed Jan. 11, 2016, the entire disclosure of which, including the drawing, is hereby incorporated by reference.

BACKGROUND OF THE INVENTION

1. Field of the Invention

The present invention pertains to lay-up molds. More particularly, the present invention relates to hybrid lay-up molds. Even more particularly, the present invention concerns molds used in the manufacture of aerospace composite parts.

2. Description of Related Art

As is known to those skilled in the art to which the present invention pertains, the use of carbon fiber (CF) composite material and Invar® alloys in fabricating molds for the manufacture of various aerospace components or parts is well documented. See, inter alia, U.S. Pat. Nos. 6,759,002; 8,511,362; 6,168,358; as well as European Patent No. 0642904 and U.S. Patent Publication Nos. 2009/035412 and 2015/009834.

Molds fabricated from CF composite materials are lighter in weight compared to Invar® molds, and are characterized by a lower thermal mass than an Invar® mold. Therefore, CF composite molds have shorter heat up and cooling times, which allows for a faster cycle time in an oven or autoclave.

CF reinforced composite materials have been used to fabricate various sizes of lay-up molds. These molds are typically fabricated from either epoxy, bismaleimide (BMI), benzoxazine, or similar resins, which are reinforced with CF fabric, tape, chopped mat, or comparable material. The mold is then cured using heat and pressure. The so-produced molds are used in hand lay-up, tape laying, and fiber placement mold manufacturing processes. Such CF composite material lay-up molds are typically employed at, processing or curing temperatures ranging from about 250° F. to about 425° F., depending on the resin system used with the CF to make the composite part.

Where higher processing temperatures and high volume production runs are required, i.e., 350° F. or higher, such molds are usually manufactured or fabricated from either Invar® 36 or Invar® 42 iron-nickel alloys. Invar® 36 molds are useful at temperatures of up to about 550° F. while Invar® 42 molds are usually employed at temperatures of up to about 700° F.

Conventional Invar® molds, are usually formed from Invar® plate stock having an eggcrate shape or similar support structure configuration and a working surface. The plates used to fabricate the eggcrate support structure usually have a thickness ranging from about 0.25" to about 0.50". The final working surface of the mold, generally, is fabricated from plates having an initial thickness ranging from about 0.50" to about a 1.0" thickness.

After fabrication, the working surface of the plate stock is machined to the final configuration of the composite part that will be laid up on the mold. These Invar® molds have two to four times the weight of a CF composite material mold and, therefore, have a higher thermal mass requiring a longer heat up and cooling time.

The biggest advantage to an Invar® mold is its ability to be cycled an almost infinite number of times at temperatures ranging from about 350° to about 700° F., depending on the Invar® alloy, without requiring replacement. Contrariwise, a CF composite mold, when used at high temperatures, i.e., from about 250° F. to about 400° F., has a finite life of approximately 50 to 500 cycles, depending on the resin system and use temperature. When approaching the end life of the CF composite mold, the mold begins to degrade to a point where it must be replaced.

It is to be thus appreciated that if the respective advantageous properties of a CF composite mold and an Invar® mold could be integrated into a single mold then, clearly, an advantageous resultant product would be achieved.

The present invention, as detailed below, provides a mold which achieves this purpose.

SUMMARY OF THE INVENTION

The present invention provides a hybrid mold which, generally, comprises: (a) an eggcrate support structure, (b) an Invar® interim working surface, and (c) a CF composite material overlay.

The interim or intermediate working surface comprises a single sheet or a plurality of thin sheets of the Invar® material which are welded together at their respective abutting sheets, which in turn, are welded to the eggcrate structure to cooperatively create a stable and vacuum tight base structure.

The CF material is deposited on the Invar® interim working surface and vacuum bagged with sealant tape or the like and thereafter bonded to the interim working surface with heat, pressure and/or catalytic curing.

After curing and bonding the CF material is machined to its final dimensions.

For a more complete understanding of the present invention, reference is made to the following detailed description and accompanying drawing. In the drawing, like reference characters refer to like parts throughout the several views in which:

DESCRIPTION OF THE INVENTION

Figure 1:
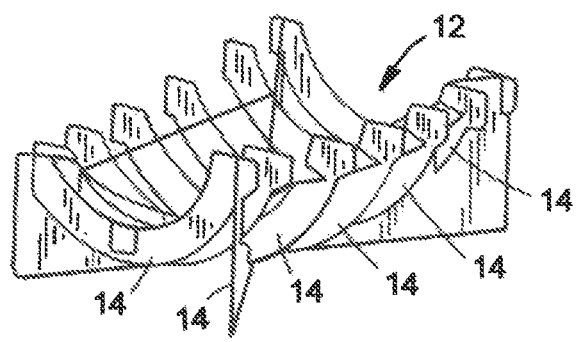
FIG. 1 is a perspective view of an Invar® eggcrate support structure of the type used herein.
Figure 2:
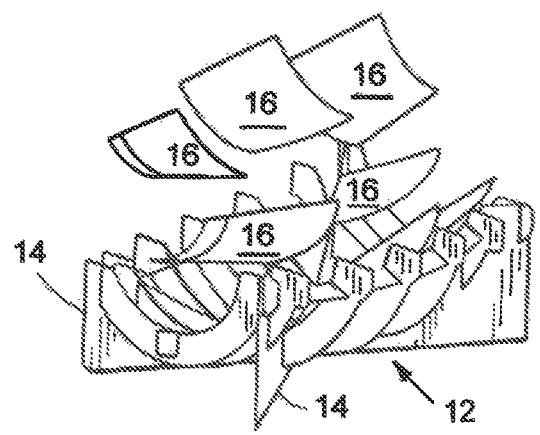
FIG. 2 is an exploded, perspective view of the thin Invar® eggcrate support structure and segmented thin Invar® formed sheets used herein.
Figure 3:
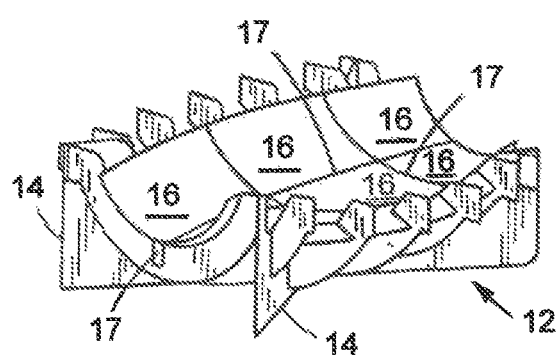
FIG. 3 is a perspective view of the thin Invar® welded eggcrate support structure and the Invar® welded segmented thin sheets.
Figure 4:
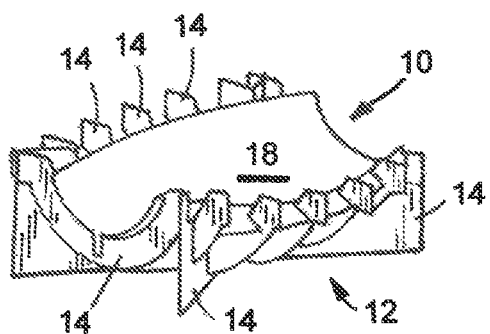
FIG. 4 is a perspective view of the Invar® eggcrate support structure and an Invar® interim working surface forming a base mold in accordance herewith.
Figure 5:
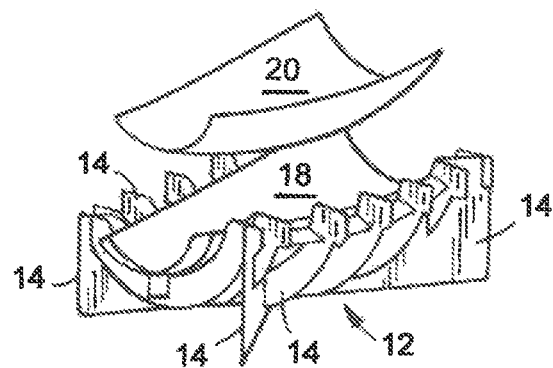
FIG. 5 is an exploded, perspective view of a hybrid mold hereof with a welded Invar® interim working surface and CF composite material overlay.
Figure 6:
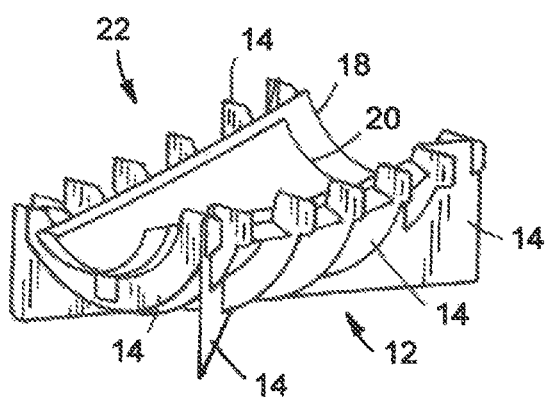
FIG. 6 is a perspective view similar to FIG. 4, but showing a finished machined CF cured overlay bonded to the Invar® interim working surface to create the final working surface of the hybrid mold.

In accordance with the present invention and with reference to the drawing, and in particular FIG. 6, there is depicted a hybrid mold, denoted at 22. As shown in the drawing, the hybrid mold, generally, comprises (a) an eggcrate structure 12, (b) an Invar® interim or intermediate working surface 18 and (c) a CF composite material overlay 20.

With more particularity, the eggcrate structure or eggcrate 12 is, preferably, a unitary structure formed from a plurality of spaced apart header boards 14. In fabricating the eggcrate, the header boards 14 are welded together to a homogeneous structure. Ordinarily, the eggcrate structure is fabricated from an Invar® material, i.e., Invar® 36 or Invar® 42. The Invar® material used for the eggcrate may be the same or different as that or "the material" used for the interim working surface. Preferably, the same Invar® material is used for both the header boards used to fabricate the eggcrate and the interim working surface.

The second component of the hybrid mold is the interim working surface 18. The interim working surface 18 comprises either a single sheet or a plurality of abutting thin sheets 16 of Invar® material.

Preferably, a plurality of abutting sheets are used. The abutting sheets have a space or seam 17 therebetween. Each sheet 16 has a thickness ranging from about 0.125" to about 0.200". After placement on the top of the eggcrate, the sheets 16 are tack welded thereto. Thereafter, the seams of the thin sheets 16 are then welded together creating a unitary interim working surface 18 which is vacuum tight.

The thin eggcrate support structure 12 and the interim working surface 18 are welded at their respective intersections by any suitable means known in the art. Together, the completed welded together eggcrate support structure 12 and the interim working surface 18 of thin Invar® sheets 16 form a base mold 10.

It should be noted that a mechanical attachment may also be utilized to join the eggcrate structure 12 and the interim working surface 18, such as that shown in U.S. Publication 2009/0035412, the disclosure of which is hereby incorporated by reference, or any other means well known to the skilled artisan. However, welding the eggcrate structure 12 to the interim working surface 18 to help ensure a vacuum tight interim working surface 18 is preferred.

The third component of the present hybrid mold 22 is the CF composite material overlay 20 which is deposited or placed atop the interim working surface and, thereafter bagged and sealed to the interim working surface 18 by sealant tape or the like. Then, the overlay 20 is bonded to the interim working surface 18 by any suitable method including, for example, by placing the bagged mold in an oven or autoclave, with or without a vacuum, applying pressure and/or vacuum combined with heat and/or any catalyst capable of curing the resin, as well as any combination thereof. The CF composite material overlay 20 is about a 0.200" minimum thickness CF composite material.

Preferably, and as shown in FIG. 6, the bond between the Invar® interim working surface 18 and the CF composite material overlay 20 is achieved by (a) depositing or laying up a CF composite material overlay 20 on the interim working surface 18, (b) vacuum bagging the CF composite material overlay 20 and the interim working surface 18, and (c) placing the vacuum bagged base mold 10 with the CF composite material overlay 20 in an oven or autoclave to cure the resin and bond it to the interim working surface. The oven or autoclave is maintained at a temperature ranging from about 250° to about 450° F. for about 30 to about 300 minutes and at a pressure ranging from 0 psig to about 150 psig while the bagged composite material overlay 20 is held under vacuum pressure ranging from approximately −14.7 psig to 0 psig.

The result is a cured CF composite material bonded to the interim working surface 18.

After the curing and bonding process, the so-produced CF composite material 20 is machined to its final dimensions which creates a composite part lay-up surface, or final working surface, of the hybrid mold 22.

It is critical to note that it is only after the CF composite material overlay 20 is bonded to the Invar® interim working surface 18 does the machining of the final working surface to final dimensions occur.

In preparing the overlay 20, among the useful CF materials that can be used for the manufacture of the CF composite material overlay 20 include, for example, woven CF fabrics, chopped CF mats, CF unidirectional mats, CF unidirectional tapes, stitched CF multi-layer mats, and CF random orientation fabrics, all of which are well-known and commercially available.

Where used, the chopped fiber mats can be used alone or in conjunction with a variety of other fiber reinforced materials. Use of unidirectional mats, unidirectional tapes, and stitched multi-layer mats may also be combined with woven fabrics which are ideal for reinforcement and increased durability.

The CF composite material 20 used herein, itself, can be manufactured by any suitable process well known to the skilled artisan, including, for example, pre-impregnated or pre-preg fabric systems, CF resin infused fabrics, sheet molding compounds, press molded composite materials, match or bladder molded composites, wet laminated materials and the like.

Sheet molding compounds are fiber reinforced thermoset materials typically used in situations involving press molded components. A sheet molding compound, generally, comprises a mixture of polymer resin, inert fillers, fiber reinforcement, catalysts, pigments, stabilizers, thickeners and the like. In manufacturing sheet molding compounds, the CF material is split into separate top and bottom layers and coated with a polyethylene or nylon plastic film to prevent auto-adhesion. The sheet molding compound is usually in the form of a paste having chopped fibers in admixture therewith which is spread evenly along the bottom layer. Finally, the top and bottom layers are sandwiched together and rolled to a pre-determined thickness.

The CF resinous composite materials which may be used are fabricated using CF resin infusion materials, generally, including a dry fabric pre-form, where an epoxy, BMI, or similar resin system is drawn into the pre-form using vacuum pressure only. The resin infused material is cured by heat at the desired temperature, while under the vacuum.

A CF pre-preg system involves a process wherein the CF is pre-impregnated with a resin system. Both thermoset and thermoplastics can be used as impregnants, including, for example, phenolic resin, thermoplastics, such as polyaryletherketone (PAEK), polyetheretherketone (PEEK), polyetherketone (PEK), BMI resins, PMR, e.g. PMR-15, and the like, as well as epoxy resins, benzoxazine resins, cyanate esters, polyimides, acrylic resins, as well as mixtures or equivalents thereof.

Also, a thermoplastic-CF hybrid composite material, as well as inorganic sprayable materials, such as, for example, calcium, gypsum, ceramics with a binder resin, mineral-based putties, slurries, blends and the like may be used.

Kevlar may also be used as a substitute for the CF.

In manufacturing the present hybrid mold 22, the CF composite material overlay 20 is applied only after the eggcrate support structure 12 and interim working surface 18 are assembled, welded together, cleaned, and sandblasted.

Preferably, the CF composite material is a multilayer, woven or chopped fiber, pre-impregnated fabric. The material may be impregnated with either an epoxy or a BMI resin system depending on the service temperature and number of cycles expected from the mold. This material is subsequently autoclave or oven cured and bonded to the interim working surface 18.

It must be noted further that the vacuum integrity of the hybrid mold 22 is accomplished by the Invar® interim working surface 18 and is not dependent upon the vacuum integrity of the machined CF composite material 20.

After 50 to 500 cycles, the CF composite material 20 may require replacement. Replacement is accomplished by removing the CF composite material 20 from the Invar® interim working surface 18; placing the hybrid mold 22 in an oven, and raising the temperature of the hybrid mold 22 to above the thermal degradation temperature of the resin, but below the temperature where the Invar® may distort or otherwise be affected. The hybrid mold 22 is kept in the oven for a sufficient period of time to degrade the resin which enables the removal of the degraded CF composite material 20 while, also, enabling easy cleanup or sandblasting of the Invar® interim working surface 18.

Thereafter, a new CF composite material 20 is laid up and bonded onto the Invar® interim working surface 18 in the manner as described above and which is thereafter machined and finished.

It is also possible to simply add on to an existing CF composite material overlay 20 by bonding additional CF composite material onto the existing CF overlay. This allows for minor changes to be made to the hybrid mold 22 without remaking an entirely new mold.

It is apparent that a significant advantage of the present invention is the effect of integration of surface changes into the molded product since the machining of the hybrid mold 22 is not done until the CF composite material overlay 20 has been bonded to the Invar® interim working surface 18.

It must further be noted the present hybrid mold 22 has been depicted and described as comprising the symmetrical eggcrate support structure 12 fabricated from plate stock. However, it is to be understood that the hybrid mold 22 can have different configurations depending on the shape of the part to be fabricated. Likewise, tubular elements, which may be cylindrical, rectangular, or of other geometry, may be used in lieu of the plate stock.

Further, it is to be readily appreciated that in practicing the present invention, the actual bonding of the CF composite material 20 to the interim working surface 18 takes place under vacuum and in a heated oven or heated autoclave. Likewise, the actual molding of an aerospace composite part is carried out with the product being inside a vacuum bag within a heated oven or heated autoclave. Therefore, the machined surface of the CF composite material overlay 20 becomes the final working surface of the composite part to be manufactured.

It should also be noted that the CF composite material overlay 20 of the hybrid mold 22 is never directly exposed to heated air above ambient room temperature thereby providing a longer cycling capability. This is accomplished because the CF composite material overlay 20 and the composite part are fully encapsulated in the vacuum bag which is sealed to the interim working surface 18 of the Invar® base mold 10 during curing in an oven or autoclave.

An additional and significant advantage of the present invention, as compared with a traditional CF composite mold, is that a traditional CF composite mold requires a master mold or pattern that is used to form the CF composite working surface. This master mold or pattern often makes up a significant portion of the time and cost needed to manufacture a traditional CF composite mold. The present hybrid mold eliminates the need for a master mold or pattern by utilizing the thin Invar® eggcrate structure 12 and thin interim working surface 18 as the means to produce the contoured CF composite material component from the final working surface of the hybrid mold 22. By integrating favorable attributes of both a thin Invar® mold and a CF composite material mold, the present invention demonstrates an advantage as compared to traditional molds made from either Invar® or CF composite materials currently used today.

While the present invention has been described with reference to manufacturing aerospace components, it is to be appreciated that the present molds can be used in any environment where high temperature molding of composite parts is desired or necessary including, not only in the aerospace industry, but in the automotive industry and elsewhere, as well.

It is apparent from the preceding that the present invention provides a hybrid mold 22 having a lower thermal mass than an all Invar® mold. It is also to be appreciated that the vacuum integrity of the hybrid mold 22 is derived from the interim working surface 18, not the CF composite material 20, as is the case in a traditional CF composite mold, which gives the mold a longer life span than a traditional composite mold with easier reconfiguration or CF composite overlay replacement options.

Having, thus, described the invention, what is claimed is:

1. A method for manufacturing a hybrid lay-up mold, comprising:
    (a) providing an iron-nickel alloy eggcrate structure;
    (b) creating an iron-nickel alloy interim working surface overlaying the eggcrate structure, the working surface comprising a plurality of abutting thin sheets of an iron-nickel alloy, the abutments creating a plurality of seams;
    (c) tack welding the plurality of abutting thin sheets to the eggcrate structure;
    (d) welding some of the adjacent abutting sheets of the plurality of abutting sheets together at their seams to define a unitary vacuum tight interim working surface;
    (e) applying a carbon fiber (CF) composite material atop the interim working surface;
    (f) vacuum bagging and sealing the CF composite material to the interim working surface;
    (g) bonding the CF composite material to the interim working surface; and
    (h) thereafter machining the CF composite material overlay to its final dimensions.

2. The method of claim 1, wherein the carbon fiber (CF) composite material is bonded to the interim working surface, by bagging a unitary base mold and the carbon fiber composite, the base mold being a combination of the iron-nickel alloy eggcrate structure and the iron-nickel alloy interim working surface and, thereafter, applying vacuum in an oven or autoclave and heating the so-bagged base mold to a temperature sufficient to cure the resin.

3. The method of claim 1 which further comprises: applying a new CF composite material overlay to the interim working surface after degradation of the previous CF composite material overly and thereafter repeating steps (f), (g), and (h).

4. The method of claim 1 which further comprises:
    welding together a plurality of header boards to create the eggcrate structure.

5. The method of claim 1 wherein the CF composite overlay is an epoxy, benzoxazine, or BMI impregnated woven cloth or chopped fiber mat.

* * * * *